(12) United States Patent
Corke et al.

(10) Patent No.: US 8,513,583 B2
(45) Date of Patent: Aug. 20, 2013

(54) METHODS AND APPARATUS FOR PLASMA BASED ADAPTIVE OPTICS FOR GENERATING A FIRST PLASMA GRADIENT AND A SECOND PLASMA GRADIENT

(75) Inventors: Thomas C. Corke, Granger, IN (US); Eric H. Matlis, Mishawaka, IN (US)

(73) Assignee: The University of Notre Dame du Lac, Notre Dame, IN (US)

( * ) Notice: Subject to any disclaimer, the term of this patent is extended or adjusted under 35 U.S.C. 154(b) by 328 days.

(21) Appl. No.: 12/953,114

(22) Filed: Nov. 23, 2010

(65) Prior Publication Data

US 2011/0121158 A1    May 26, 2011

Related U.S. Application Data

(60) Provisional application No. 61/281,817, filed on Nov. 23, 2009.

(51) Int. Cl.
*G01J 1/20* (2006.01)

(52) U.S. Cl.
USPC .................................. 250/201.9; 250/239

(58) Field of Classification Search
USPC ............. 250/201.9, 239, 216, 203.1–203.6, 250/221; 315/111.21–111.81, 493–582, 315/227; 356/316; 359/315–318; 156/67, 156/230
See application file for complete search history.

(56) References Cited

U.S. PATENT DOCUMENTS 5,268,056 A * 12/1993 Kishi et al. ............... 156/345.39

OTHER PUBLICATIONS

PCT—Notification Concerning Transmittal of International Preliminary Report on Patentability (Chapter 1 of the Patent Cooperation Treaty) regarding PCT/US/2010/057858; Jun. 7, 2012; pp. 1-6.
Abstract—Ding et al., "Plasma-Induced Spatiotemporal Modulation of Propogating Femtosecond Pulses", Chinese Optics Letters, vol. 4, No. 10, pp. 617-620; Oct. 10, 2006.
Abstract—Lisitsyn et al., "Effect of Laser Beam Deflection on the Accuracy of Interferometer Measurements", Review of Scientific Instruments, vol. 69, Mo. 4, pp. 1584-1586, Apr. 1998.
Abstract—Linardarkis et al., "Plasma-Based Lens for Microwave Beam Steering", Electronics Letters, vol. 42, No. 8, Apr. 13, 2006.

* cited by examiner

*Primary Examiner* — Que T Le
(74) *Attorney, Agent, or Firm* — Greenberg Traurig, LLP

(57) ABSTRACT

An adaptive plasma optics cell includes a housing defining a chamber, and a gas disposed within the housing chamber. A first light transmissive electrode layer is coupled to a first side of the housing and a first light transmissive dielectric layer is coupled between the first light transmissive electrode layer and the housing chamber. A second electrode layer is coupled to a second side of the housing such that the housing chamber is at least partially disposed between the first and second electrode layers and a second dielectric layer coupled between the second electrode layer electrode and the housing chamber. In operation, a power supply is controlled such that the power supply selectively supplies an electric signal sufficient to cause the gas to generate a plasma having a desired plasma gradient.

20 Claims, 12 Drawing Sheets

Addressable Plasma Cells

METHODS AND APPARATUS FOR PLASMA BASED ADAPTIVE OPTICS FOR GENERATING A FIRST PLASMA GRADIENT AND A SECOND PLASMA GRADIENT

CROSS REFERENCE TO RELATED APPLICATION

This application is a non-provisional application claiming priority from U.S. Provisional Application Ser. No. 61/281,817 filed Nov. 23, 2009, entitled "Plasma Optics" and incorporated herein by reference in its entirety.

FIELD OF THE DISCLOSURE

The present description relates generally to adaptive optics and more particularly, to methods and apparatus for plasma based adaptive optics.

BACKGROUND OF RELATED ART

This disclosure describes an innovative plasma based adaptive optics approach that improves the performance of optical systems by reducing external optical distortions.

Adaptive optics (AO) is generally used to improve the performance of optical systems by reducing the effect of wavefront distortions. In some examples, adaptive optics is used in astronomical telescopes and laser communication systems to remove the effects of atmospheric distortion, or in retinal imaging systems to reduce the impact of optical aberrations. Adaptive optics works by measuring the distortions in a wavefront and compensating for them with a spatial phase modulator such as a deformable mirror (DM) or liquid-crystal devices (LCDs).

Current adaptive optics approaches involve deformable mirrors including mechanical actuators that oftentimes have limited frequency and spatial resolution. Similarly, known liquid-crystal devices often have limited bandwidth.

For instance, two known technologies have been embraced by the adaptive optics community, deformable mirrors and light emitting diode (LED) current pulse measurement systems (LCPMS). Deformable mirrors typically use a thin (e.g., 1 mm or less) continuously reflective surface that is manipulated by ceramic, piezoelectric, or electrostrictive actuators to modify the wavefront. These actuators are usually expensive, which limits the number that can be used and thus the overall spatial resolution of the minor, and are restricted to low frequencies due to their mechanical inertia. Microelectromechanical systems (MEMS) based deformable mirrors have been developed, but these system offer only limited improvements in bandwidth.

LCPMs, meanwhile manipulate wavefronts in a local manner. LCPMs do offer the advantage over deformable minors in that they are able to correct wavefronts providing high levels of spatial resolution, but they offer low bandwidth. In addition, LCPM techniques typically have problems arising due to polarization dependence, pixilation, high chromaticity of the corrected wavefront, and low correction capabilities.

The two challenges facing adaptive optics technology for practical use are the spatial and temporal resolution provided by the wavefront correction device, although each industry, such as, healthcare, military, astronomy, etc. may have different requirements for both. For example, applications in free-space secure communications and astronomy require very high bandwidth due to the inherent nature of the atmospheric turbulence, whereas, in the application of retinal scanning, very high spatial resolution is required to visualize the retina properly.

Laser communications and aero-optics are particularly challenging applications because of the high frequency nature of the distortion caused by the high speed flow that passes over the lens. The light source consists of a laser that is mounted on the fuselage of an aircraft. The laser beam is distorted by disturbances in the external flow passing over the aperture of the lens. Generally, two types of flows are responsible for aero-optical aberrations, high-speed shear layers and boundary-layers. These flows are optically active and produce time-varying near-field wavefront aberrations with high-frequency content.

Thus, there is a need for adaptive optics that improves the performance of known optical systems, while addressing the varying requirements of applications requiring adaptive optics systems.

DETAILED DESCRIPTION

The following description of example methods and apparatus is not intended to limit the scope of the description to the precise form or forms detailed herein. Instead the following description is intended to be illustrative so that others may follow its teachings.

The presently described example plasma based adaptive optics utilizes a device comprising an array of miniature weakly ionized alternating current (AC) plasma "cells" to generate a fast responding highly controllable wavefront distortion with a prescribed spatially varying phase. The phase is controlled through changes in the index of refraction of the plasma which is dependent on its electron density. The electron density is controlled by varying the root mean square (RMS) amplitude of the voltage applied to each plasma cell. Each example cell is made up of a parallel arrangement of transparent electrodes such as, for example, Indium Tin Oxide (ITO) and a dielectric material to produce a Dielectric Barrier Discharge (DBD) within the volume of the cell. The cells are individually and electronically controlled, and in at least one example, can be made with feature sizes of 10's of microns to give high spatial resolution. The cells are combined and organized to form an array, which is distributed over the aperture of the optical device. A prescribed wavefront is generated through appropriate control of the individual cells that make up the array. Due to its fully electronic nature, the bandwidth is high and is limited only by the time response of the ionization process of the plasma which can be lower than 10 µs giving a frequency response over 100 kHz.

Figure 1:
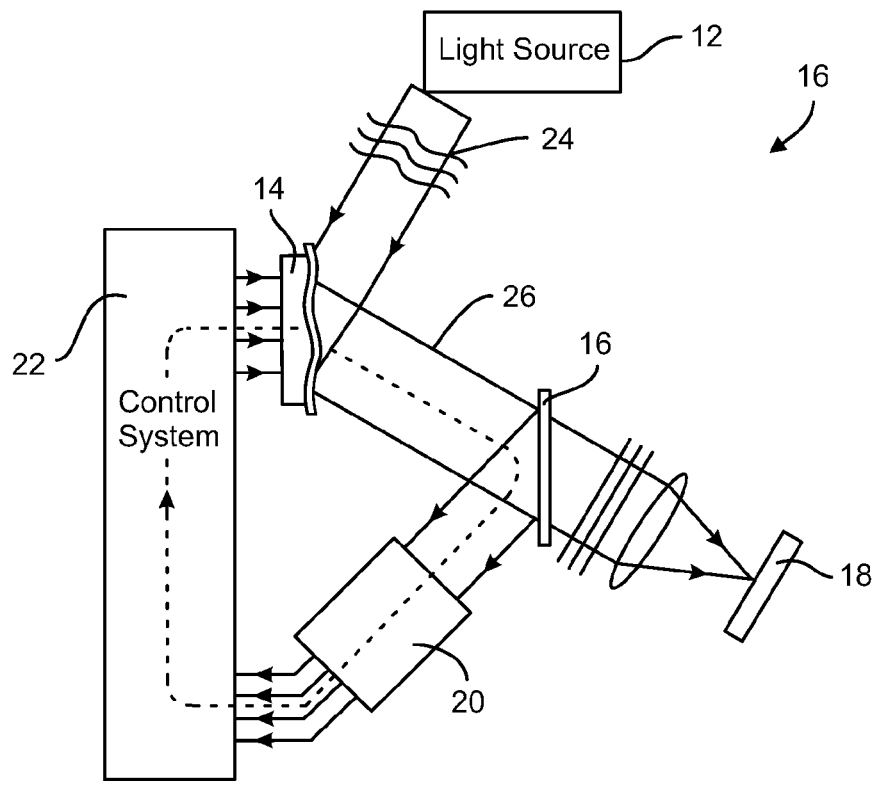
FIG. 1 is an illustration of an example adaptive optics system.

Referring now to FIG. 1, there is illustrated an example adaptive optics system 10. The example system 10 generally includes a light source 12, an adaptive plasma optics device 14, such as an adaptive mirror, a beam splitter 16, a light collector 18, a wavefront sensor 20, and a control system 22. Specifically, in this example, the light source 12 may be any suitable light source, such as, for example, a telescope. The light source 12 emits a beam 24 having a wavefront that may be subject to distortion (e.g., shear boundary layer, atmospheric, etc).

In this example, the beam 24 passes through the adaptive plasma optics device 14, for example an adaptive mirror, and is modified to form a resultant beam 26 having at least a partially modified (e.g., corrected) wavefront. For instance, the adaptive plasma optics device 14 refracts the beam 24 as it passes through the device 14 to change the wavefront of the beam 24 to a modified resultant beam 26. The example resultant beam 26 may then travel through the beamsplitter 16 to allow a portion of the beam 26 to pass through to the light collector 18, such as a high-resolution camera. Similarly, a portion of the beam 26 may be directed towards the wavefront sensor 20, which is configured to detect the characteristics of the wavefront of the beam 26. The detected characteristics of the beam 26 are transmitted to the control system 22, where a controller, such as computer processor, identifies any wavefront distortion present in the beam 26 and sends a controlling signal to the adaptive device 14 to modify the reflective characteristics of the adaptive plasma optics device 14 as described herein. The system 10 may be adapted to periodically or continuously sense and correct the adaptive plasma optics device 14.

In the present example, each of the adaptive device 14, the light collector 18, the beam splitter 16, the control system 22, and the wavefront sensor 20 are illustrated as separate elements. It will be understood, however, that any component of the present example, including for example, the wavefront sensor 20 and the light collector 18, the adaptive device 14 and the control system 22, may be combined and/or separately formed as desired. Similarly, the control and/or sensor functionality of each of the described elements may be combined and/or integrated into any of the elements as desired.

Figure 2:
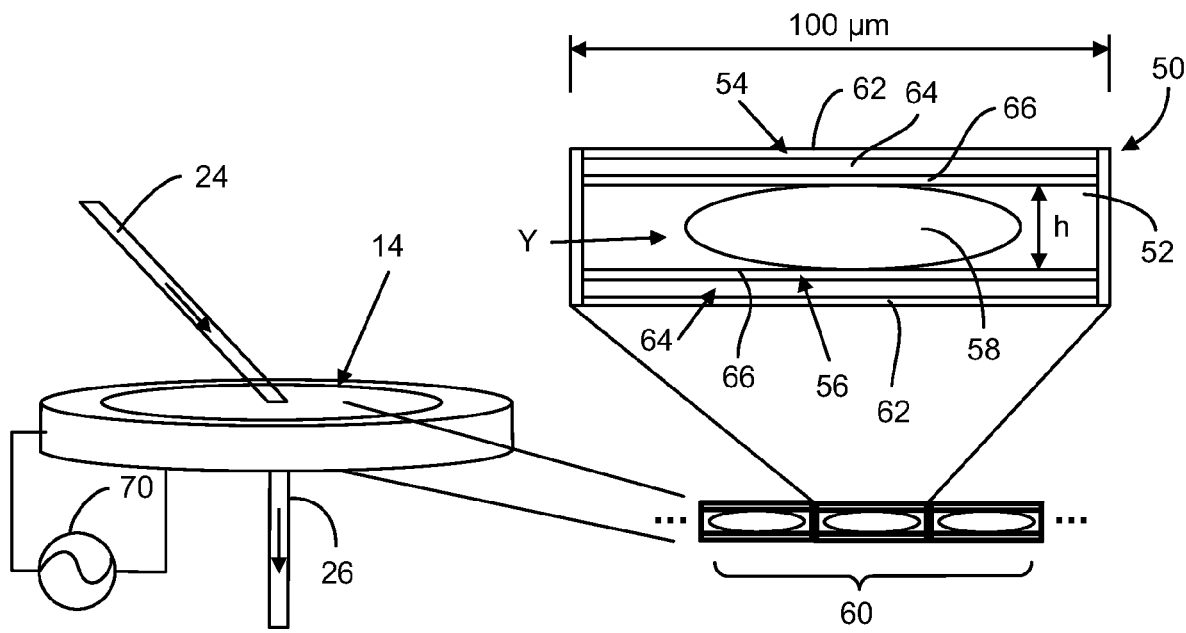
FIG. 2 is an illustration of an example adaptive optics device for use in an adaptive optics system.

Referring to FIG. 2, in this example, a plurality of plasma cells 50 are used to form a horizontal array 60 of plasma cells that together form the adaptive plasma optics device 14. As illustrated in FIG. 2, each example plasma cell 50 includes a housing defining a chamber in which a gas 52 is ionized by applying an electric field across two electrodes 54, 56 separated by a gap h to form a plasma 58. The formed plasma 58 may fill at least a portion of the volumetric space v defined between the electrodes 54, 56, using low power and producing little heat. In the illustrated example, each electrode 54, 56 comprises an electrode layer 62 formed on an outer surface of a glass layer 64. A dielectric layer 66 is formed on an inner surface of the glass layer 64 and together, the dielectric layers 66 form the boundary of the volumetric space v, such as, for example, a low pressure chamber. Each of the example electrodes 54, 56 are formed to be at least partially transparent to allow the light beams 24, 26 to pass through the plasma cell 50. In another example, at least a portion of one of the electrodes 54, 56 may include a reflective surface such that light entering the plasma cell 50 is reflected back through the plasma cell 50 and out the side in which the light entered. For instance, in this example, the electrode layers 62 are thin layers of Indium Tin Oxide, but may be any suitable electrode material. In some examples, the use of a transparent electrode allows for a plurality of plasma cells 50 to be stacked vertically (not shown) with as many plasma cells 50 as required while still being optically transparent.

Figure 8:
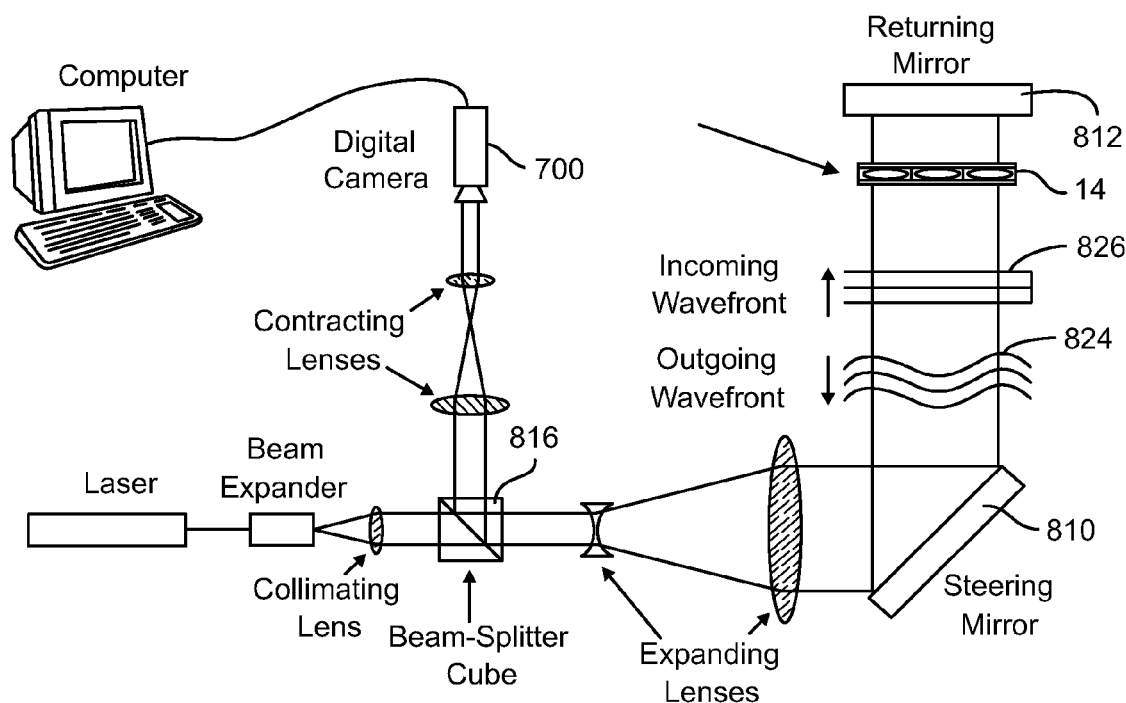
FIG. 8 is an illustration of another example adaptive optics system.
Figure 11:
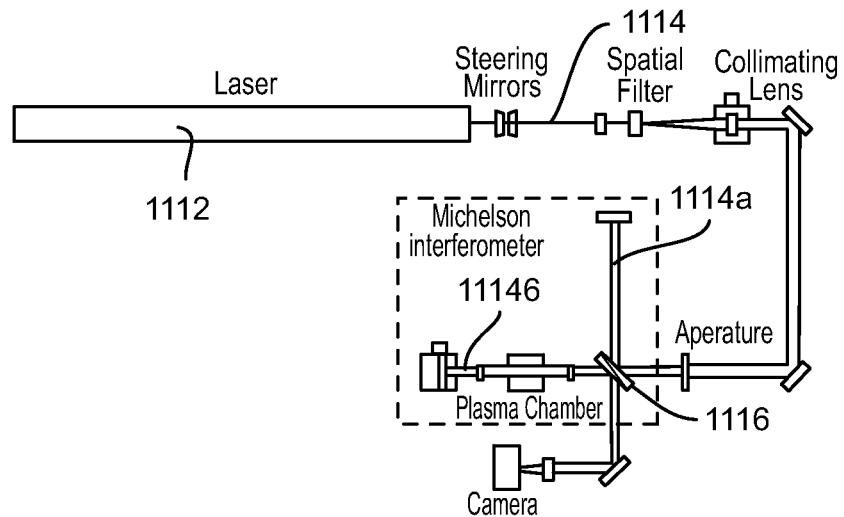
FIG. 11 is an illustration of another example adaptive optics system.

Additionally, while the array 60 of plasma cells 50 forming the adaptive optic device is described in one example as an adaptive mirror, the adaptive plasma optics device 14, may be designed such that the light beam 24 does not reflect off a reflective surface, but rather passes through the adaptive optical device 14. In particular, in one example, the light beam 24 enters and exits the adaptive optical device on the same side after reflecting off a reflective surface (FIG. 1), while in other examples the light beam 24 enters the adaptive optical device 14 on one side and exits on the opposite side (FIGS. 8 and 11). In other words, the entirety of the adaptive optical device 14 may be light reflective and/or light transmissive as desired.

The example plasma cells 50 may be manufactured using any suitable manufacturing technique, including, for instance, a MEMS approach to any appropriate scale, including approximately 100 µm. Each individual plasma cell 50, and/or group of plasma cells 50 may be electronically controlled by the control system 22 to vary an intensity of the plasma 58 in the volumetric space v. The electronic nature of the example system 10 and small scales of each of the example plasma cells 50 allows for a very high temporal bandwidth and spatial resolution. While the example system 10 is electronic with no mechanical actuators, the system 10 may include at least one mechanical actuator (i.e., a hybrid system) as desired.

In operation, the index of refraction of the plasma 58 depends on the density of the generated plasma 58. For instance, in the example of FIG. 2, an AC high voltage source 70 is used to generate the plasma 58 with gradients in density to actively refract (e.g. bend) the light beam 24 in substantially real-time. The density of the plasma 58 is controlled by varying the strength of the external AC field.

In one example, the configuration of the electrodes 54, 56 are driven by the use of sub-millimeter plasma lamps (not shown) which are individually controlled to emulate separate refractive characteristics. The small size (approximately 100 µm), and individual control of each example plasma cell 50 provides very high spatial resolution. Similarly, the effective optical correction in each example plasma cell 50 is controlled by varying the voltage to the plasma cell 50 in near real-time. Thus, the adaptive plasma optics device 14 is capable of modifying and/or correcting a specific wavefront pattern by creating an appropriate map of varying plasma intensity across all the plasma cells 50 that make up the array 60 forming the aperture of the adaptive plasma optics device 14.

Without mechanical parts, the time-response of the example adaptive optical device is quite high, limited only by the dynamics of the decay of the plasma 58. The decay in a generated dielectrically coupled plasma is controlled by a number of different mechanisms, including, for example, ambipolar diffusion and/or other recombination losses. Because the example plasma cells 50 are quite small, ambipolar diffusion dominates the decay process. This control mechanism has a time response of approximately a few µs, giving the plasma cell 50 a bandwidth of over 100 kHz.

In one example, the beam 24 is a beam from a laser. Aberrations that affect the wavefront of the laser are quantified by calculations of the Optical Path Length (OPL). The Optical Path Length is a measure of wavefront distortion and is defined in Equation (1) as:

$$OPL(t,x) = \int_{y_1}^{y_2} \eta(t,x) dy. \tag{1}$$

where $\eta(t,x)$ is the index of refraction field along the path x over which the beam travels at time t. Typically, the absolute Optical Path Length is not directly measured; instead relative affects are considered which is represented by the Optical Path Difference (OPD). The Optical Path Difference gives the change in the Optical Path Length over the aperture of the lens in question and is defined in Equation (2) as:

$$OPD(t,x) = OPL(t,x) - \overline{OPL}(t), \tag{2}$$

where the overbar is to indicate a spatial average over the aperture. In the conventional use of adaptive optics, mirrors are deformed to create a wavy surface containing the complex conjugate of the distortion. This waviness effectively "cancels out" the incoming aberration in the laser so that the beam exits the mirror with a planar wavefront. The degree of surface distortion required on the mirror is quantified by the "stroke" of the mirror, which is also in units of Optical Path Difference and must have the same magnitude as the incoming wavefront distortion to be effective.

A measure of the impact optical aberrations have on the performance of a laser is the Strehl Ratio (SR) defined in Equation (3) as:

$$SR(t) = \frac{I(t)}{I_o}. \tag{3}$$

Where I(t) is the maximum light irradiance in the far-field pattern for an aberrated system, which depends on index of refraction and wavelength, and $I_o$ is the maximum light irradiance for the optical system without aberrations. A Strehl Ratio of less than 1 indicates that the aberration has reduced the performance of the laser. The wavelength used by airborne systems is particularly sensitive to the optical aberration and for these lasers the Strehl Ratio can be as small as 0.04. This means that optical aberrations reduce the effectiveness of the laser by approximately 96%.

This degree of signal attenuation makes the laser effectively useless. Canceling the wavefront distortion require deformable optics with bandwidths that are available with the adaptive plasma optics device 14 which overcomes the high-speed nature of the flow. In known mechanical systems, however, the inertia inherent to mechanically deformed optics guarantees that they will never have a frequency response high enough to effectively cancel these aberrations in substantially real-time.

The usefulness of the presently describe plasma adaptive plasma optics device 14 is related to the effective "stroke", i.e. the Optical Path Difference that is induced in an incoming beam 24 wavefront by the plasma 58. In this instance the wavefront correction is obtained not by physically deforming the surface of a mirror but by adjusting the intensity and distribution of the plasma 58 in individual plasma cells 50. An estimate of the Optical Path Difference can be found by starting with Equation (4), which is a function of the index of refraction $\eta_P$ and the thickness of the plasma cell h:

$$OPD(y) = (\eta_P - 1)h. \tag{4}$$

The index of refraction, meanwhile, is related to the plasma frequency by Equation 5:

$$\eta_P = \sqrt{1 - \frac{\omega_P^2}{\omega_{opt}^2}} \tag{5}$$

where $\omega_P$ is the plasma frequency and $\omega_{opt}$ is the optical wave frequency. The plasma frequency is given by Equation 6 as:

$$\omega_P = \sqrt{4\pi r_e c^2 n_e} \tag{6}$$

where $r_e$ is the classical electron radius=$2.8179 \times 10^{-15}$ m, c is the speed of light=$2.99792 \times 10^8$ m/s, and $n_e$=electron number density [m$^{-3}$]. The optical wave frequency $\omega_{opt}$ is defined in Equation (7) as:

$$\omega_{opt} = \frac{2\pi}{\lambda_o} c \tag{7}$$

where $\lambda_o$ is the vacuum wavelength of light.

From this, it is evident that the electron number density determines how strongly the plasma 58 will bend light. The greater the number density, the greater the impact on the trajectory of an incident light beam 24 or the phase plane of the beam wavefront. The plasma cells 50 are controlled by adjusting the voltage applied to the plasma cell 50, which controls the degree of ionization. A distorted wavefront is then be corrected by selectively controlling the amplitude with appropriate addressing so as to obtain the desired spatial intensity distribution over the aperture of the plasma optics.

A sample calculation is provided for a configuration that includes a number of plasma cells 50 stacked vertically. This calculation is based on a value for the electron density found from known literature. For example, an electron density of $5 \times 10^{16}$ cm$^{-3}$ has been achieved in micro hollow cathode discharges in argon. Using Equation (4) for a single plasma cell 50 having a height h of 5 mm, it is possible to generate an Optical Path Difference of 0.045 μm at a wavelength of 0.633×10⁻⁶ m, which corresponds to the HeNe laser. In one example, if five plasma cells 50 are vertically stacked, the effective Optical Path Difference is 0.23 μm. An adaptive optics element with a stroke of 0.23 μm can correct all the aberrations present in either the case of the airborne laser (OPD=0.1 μm), or in the case of a typical laser communications system (OPD=0.02 μm). The adaptive plasma optics device 14, therefore, offers sufficient control authority with a bandwidth sufficiently high to fully correct the aberration in the laser wavefront for either of these types of problems.

Figure 3:
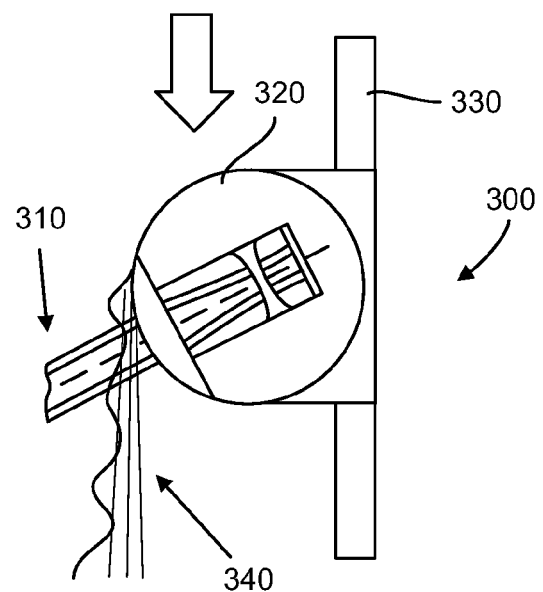
FIG. 3 is an illustration of an example distortion caused by a turret shear layer.

In one example application, illustrated in FIG. 3, the example system 10 may be adapted to correct the aero-optics of bluff bodies exposed to high subsonic speeds, such as, for example, an airborne laser-weapons programs 300. In this example, a laser 310 is typically steered from a turret 320 mounted on the fuselage 330 of an aircraft. The shape of the turret 320 is not optimal from an aerodynamic standpoint and generates a shear layer 340 with a high level of unsteadiness. This unsteadiness exists both in the flow attached to the turret 320 and in the flow that separates in the wake region. These unsteady flow structures impart a time-varying wavefront distortion to the laser beam 310 as it exits the turret 320.

Figure 4:
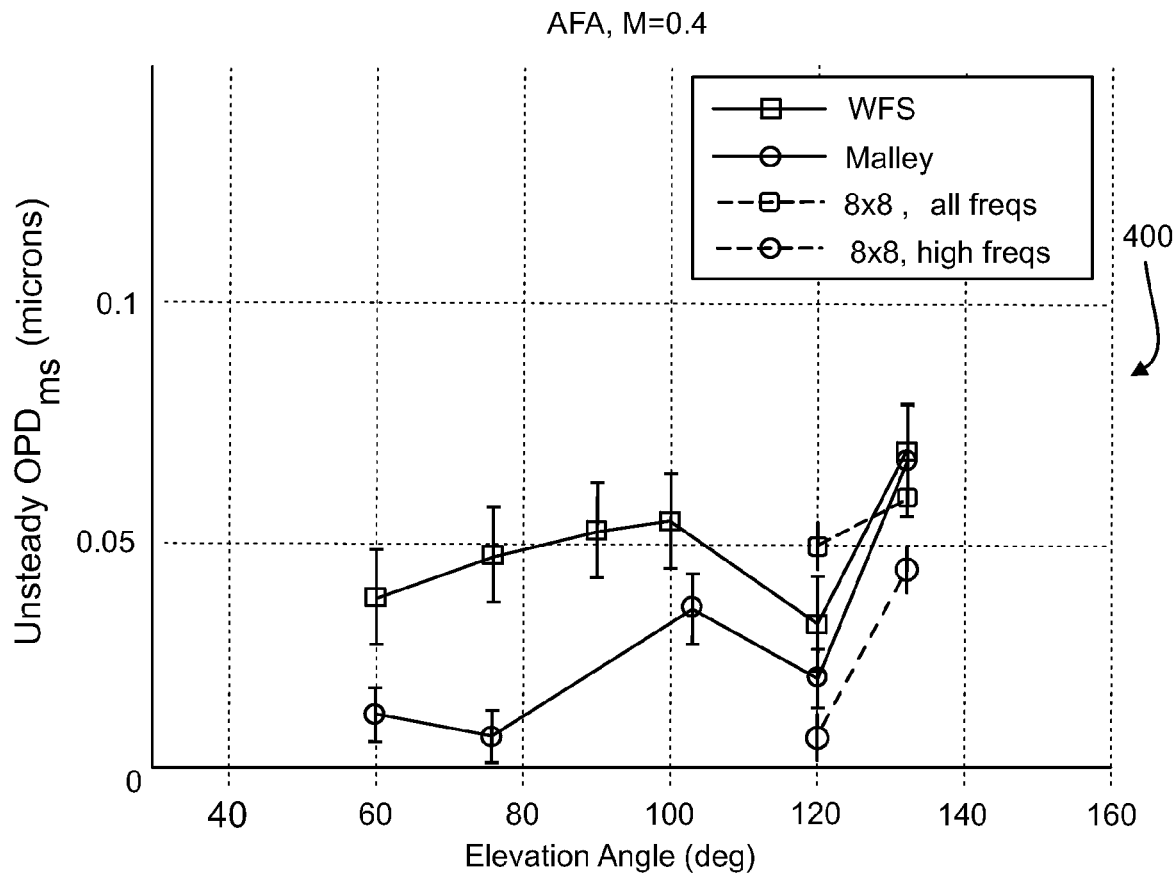
FIG. 4 is plot of an example Optical Path Difference for the turret of FIG. 3.

To document the optical affects of such a configuration, measurements where performed on a turret installed in a wind tunnel at Mach 0.4. The experiments were conducted in a 3×3×8 ft wind tunnel. The optical aberrations produced by the shear layer 340 were measured with a two-dimensional wavefront system. In this experiment, the beam 310 was directed onto the aperture of the turret 320 and the optical distortions of the beam 310 were measured using a 2-D Shack-Hartmann wavefront sensor. Results from these measurements as illustrated in FIG. 4 and indicate that the shear layer resulted in a peak-to-peak Optical Path Difference 400 of roughly 0.1 μm. This is well within the Optical Path Difference or stroke of the plasma based optics device 14.

In an example of Airborne Laser communications (not shown), the optical aberrations created by high-speed, turbulent boundary layers affect the lasers systems used on aircraft for the purpose of secure point-to-point communications. In this example there typically is no turret, but rather a fixed flat plate is used to transmit the laser. Thus, the boundary layer that forms over the lens has a strong negative impact on the Strehl Ratio at the wavelengths commonly used which are near 1 μm. At this wavelength, the Strehl Ratio is 0.67, indicating a 33% reduction in laser performance. In example, the maximum peak-to-peak Optical Path Difference determined for this configuration was found to be about 0.02 μm with frequencies greater than 5 kHz, again well within the range of correctable distortion for the describe plasma adaptive optics system 10.

Figure 5:
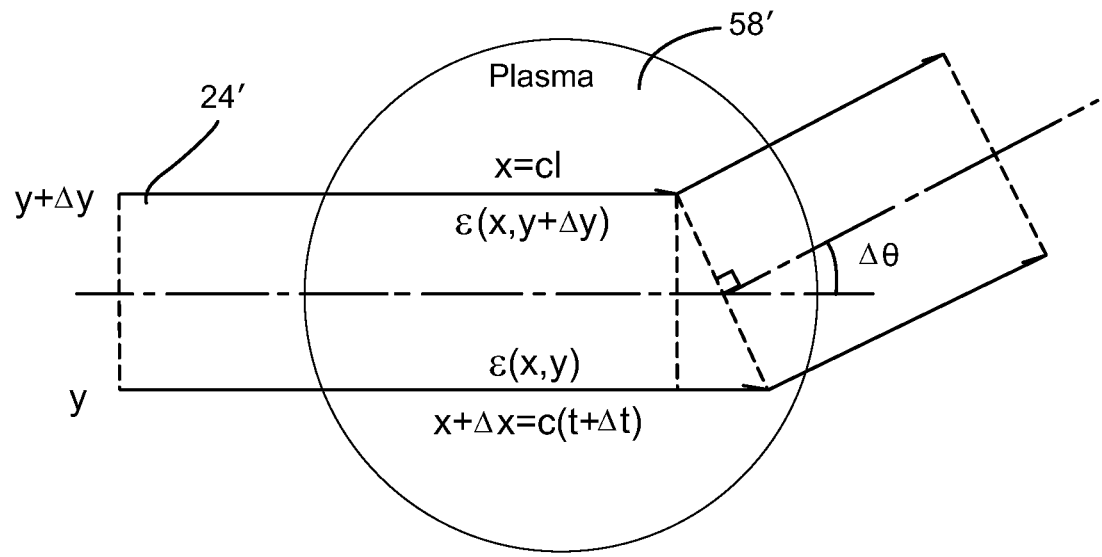
FIG. 5 is an illustration of a mechanism of laser deflection by density gradient.
Figure 6:
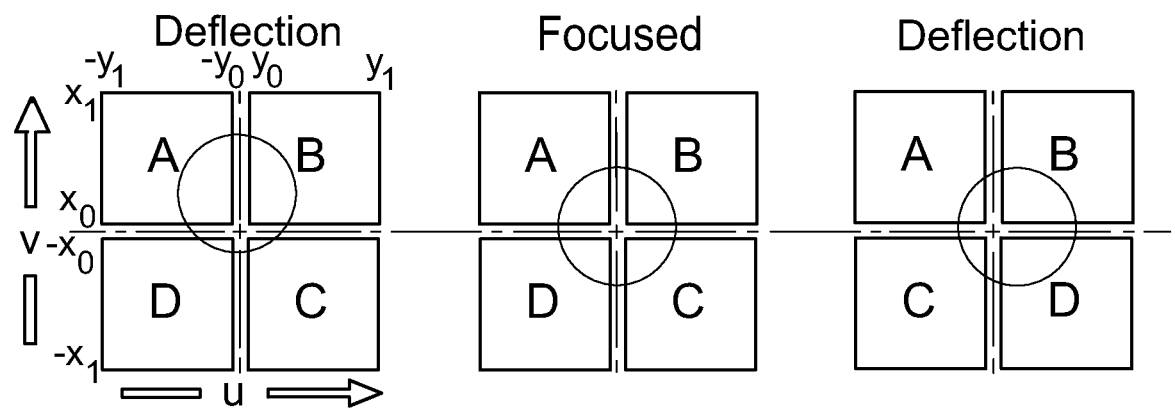
FIG. 6 is an illustration of an example four channel photo diode array for laser spot tracking.

In a simple experiment, a gradient of the density of a plasma 58' deflects an incident laser beam 24', as shown in FIG. 5. The experimental gradient may be achieved in the system 10 (of FIG. 2) by arranging a number of plasma cells 50 so that the intensity of the generated plasma 58 at each plasma cell 50 varies over the aperture of the adaptive plasma optics device 14. The resultant deflection of the laser beam 24' were recorded by a four channel photo-diode array which was used to detect both axial and radial deflection of the laser spot, as shown in FIG. 6.

Because the dielectric properties of a plasma, such as the plasma 58', are a function of its density, local variations in density will introduce variations in the phase velocity of the laser 24'. Referring to FIG. 5, the geometry in which the two parallel beams separated by a distance $\Delta y$ are propagating through the plasma 58' of dielectric function $\in(x,y)$. The two rays deflect through an angle $\Delta\theta$, the angle between the y axis and the plane of constant phase, i.e. the wavefront. If $\Delta t$ is the difference in propagation times of the rays, then for small values, the angle of deflection can be approximated by Equation (8):

$$\Delta\theta \equiv \tan(\Delta\theta) = \frac{c\Delta t}{\Delta y}, \tag{8}$$

where the difference in path length $c\Delta t$ is the difference between the (integrated) inverse wave velocities v along their beam paths. Because the velocity of an electromagnetic wave can be expressed in terms of the dielectric $v=c/\in^{1/2}$, $\Delta t$ can be expressed in Equation (9) as:

$$\Delta t = \int \frac{dx}{v(x,y)} - \int \frac{dx}{v(x,y+\Delta y)} \tag{9}$$
$$= \frac{1}{c}\int \sqrt{\in(x,y)}\,dx - \frac{1}{c}\int \sqrt{\in(x,y+\Delta y)}\,dx,$$

which makes it possible to express the angle of deflection in terms of the dielectric function as shown in Equation (10):

$$\Delta\theta = -\frac{\int \sqrt{\in(x,y+\Delta y)}\,dy - \int \sqrt{\in(x,y)}\,dx}{\Delta y} \equiv -\frac{\partial}{\partial y}\int \sqrt{\in(x,y)}\,dx. \tag{10}$$

The dielectric function of a plasma $\in=1-n_e/n_c$ is a function of plasma electron number density $n_e$ and the plasma electron critical density $n_c$ where $n_c$ is determined by the wavelength of the probe laser $\lambda_o$ as in Equation (11):

$$n_c = \frac{4\pi^2 \epsilon_o c^2 m_e}{(\lambda_o q_e)^2} \tag{11}$$

where $q_e$ is the electron charge, $m_e$ is the electron mass, and $$\epsilon_o \text{ is the permittivity of free space} = 8.85429 \times 10^{-12} \frac{C^2}{Nm^2}.$$

For the wavelengths of lasers where the critical densities $n_c \gg n_e$, the root of the function can be approximated by $\in^{1/2} \approx 1 - n_e/(2n_c)$, and the angle of deflection can be stated in terms of critical density and plasma electron number density in Equation (12)

$$\Delta\theta = \frac{1}{2n_e}\frac{\partial}{\partial y}\int n_e(x,y)dx. \tag{12}$$

From Equation (12) it can be seen that density gradients in the plasma 58' causes deflections in a propagating laser 24' which are proportional to the line integral of the transverse density gradient. A calculation of the deflection can be made if the line integrals are replaced with fixed path lengths, so that if the transverse gradient scale length is defined as $L_y = \int n_e(x,y)$ $dx/[(\partial/\partial y)\int n_e(x,y)]$ and the path length as $L_x=(1/n_e)\int n_e(x,y) dx$, deflection can be written in Equation (13) as:

$$\Delta\theta = \frac{n_e}{2n_c}\frac{L_y}{L_x}. \quad (13)$$

For a HeNe wavelength of $\lambda_o=633$ nm, the critical density is $n_c=2.5\times10^{21}$ cm$^{-3}$. For plasma cells with electron densities as small as $n_e\approx10^{-13}$ cm, with a path length $L_y\approx10$ cm and a scale length $L_x\approx0.5$ cm such a test will produce a deflection of $3.6\times10_{-8}$ rad, which is quite detectable.

Figure 7:
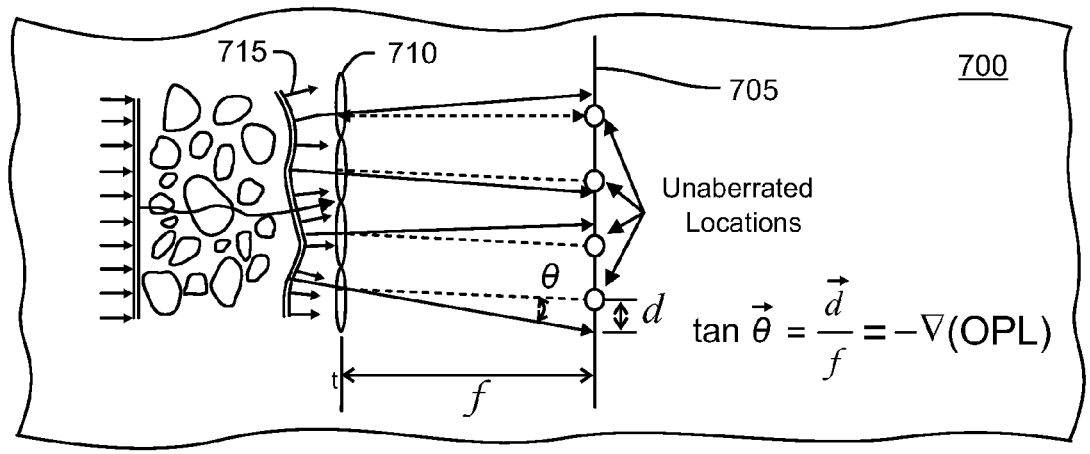
FIG. 7 is an illustration of an example operation of a sensor for the characterization of a wavefront.

While the laser deflection technique of FIGS. 5 and 6 is useful to obtain a basic measure of the ability of the plasma 58' to steer the beam 24', it does not provide any quantifiable analysis of the density gradients inside the plasma cell 50. For this a detailed characterization of the wavefront may be obtained utilizing a sensor specialized for this purpose, such as, for example, a Shack-Hartmann sensor 700 as illustrated in FIG. 7. A Shack-Hartmann sensor contains a digital ccd camera 705 in front of which is an array of "lenslets" 710. Incident light 715 is focused by each lenslet 710 as a spot onto the ccd array in the camera 705. A distortion to the wavefront produces a shift in the location of this spot on the ccd, which can be measured.

Using this technique, a measurement of the wavefront distortion caused by the plasma device can be made with a test as illustrated by FIG. 8. In this experiment, the adaptive plasma optics device 14 is placed in a light path 824 between two mirrors, a steering minor 810 and a returning mirror 812. The returning mirror 812 sends the beam 824 back through the adaptive plasma optics device 14 a second time, giving effectively twice the optical affect, which magnifies the affect. A beam-splitter 816 sends the light 824 to the wavefront sensor 700 for analysis. This example represents just one of the many system contemplated.

Having described the example system 10 is sufficient detail, the following is an sample of the experimental data presented for determining the index of refraction of a plasma generated by a non-thermal dielectric bather discharge within a cylindrical, Pyrex tube. In these experimental results, voltage, current, and electron density measurements were collected. During the description that follows, the nomenclature of Table 1 will be observed:

TABLE 1

| | |
|---|---|
| c = Speed of light | d = Electrode spacing distance |
| $\in_o$ = Electric constant | L = Length unit |
| $\lambda$ = Laser wavelength | $\lambda_{px}$ = Interferogram spatial wavelength |
| $m_e$ = Electron mass | M = Mass unit |
| N = Plasma index of refraction | $N_P$ = Non-dimensional plasma number |
| n = Plasma electron density | $n_e$ = Plasma electron density |
| $n_{e0}$ = Plasma electron density at stable plasma initiation | $n_{heavy}$ = Heavy particle density at a specific pressure |
| $n_{heavy0}$ = Heavy particle density at STP | p = Plasma chamber pressure |
| P = Plasma power | $P_{RMS}$ = Root-mean-square plasma power |
| $P_0$ = Power at stable plasma initiation | $\Pi$ = Pi-group |
| q = Elementary charge | $\Phi$ = Interferogram phase shift |
| $\Phi_{VI}$ = Voltage-current phase angle | $\rho$ = Plasma chamber air density |
| T = Time unit | $\omega$ = Electron optical frequency |
| $\omega_P$ = Plasma frequency | |

Figure 9:
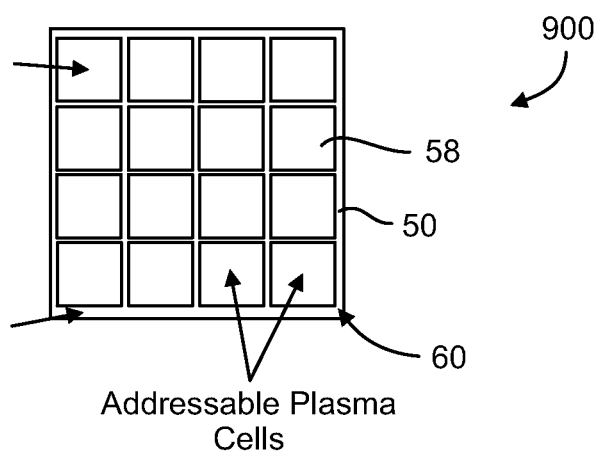
FIG. 9 is an illustration of an array of discrete, addressable plasma cells for use in the example adaptive optics device of FIG. 2.

An experimental implementation 900 of the plasma adaptive optical device 14 is illustrated in FIG. 9. In particular, the implementation 900 includes a plurality of discrete plasma cells 50 having uniform electron density, and formed into the array 60. The voltage potential of each plasma cell 50 may be uniquely controlled (for example by the control system 22), allowing for spatial control of the electron density of the plasma 58. By conducting a Buckingham-Pi model analysis, an investigation into the dependence of electron density, pressure, and power for the generated plasma 58 was conducted.

Figure 10:
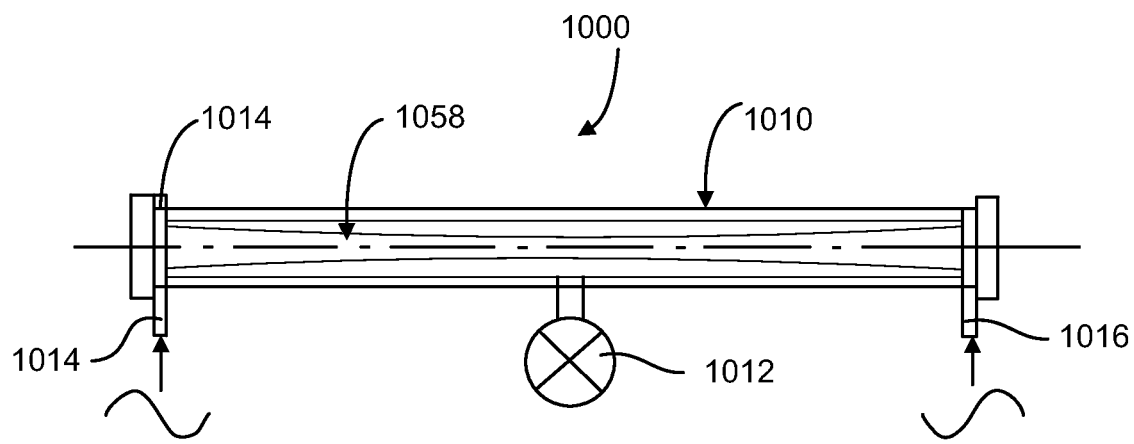
FIG. 10 is an illustration of another example plasma cell construction.

Turning to FIG. 10, measurements were collected for a cylindrical plasma chamber 1000 illustrating that adjusting the voltage potential to the plasma chamber 1000 effectively controls the index of refraction. In particular, in this example, a non-thermal, dielectric barrier discharge plasma 1058 was generated inside a cylindrical Pyrex tube 1010. In this example, the tube is 152 cm in length, with 1.9 cm diameter and 0.28 cm wall thickness. Each end of the cylinder is sealed with 2.54 cm optical windows providing for a laser's beam to pass completely through the length of the defined chamber. A vacuum valve 1012 is located halfway along the length of the cylinder allowing the defined chamber to be evacuated to low pressure and sealed. Electrode strips 1014, 1016, are placed at either end of the Pyrex tube and wrapped completely around the circumference. High-voltage AC signals are connected to the electrodes 1014, 1016 by a power supply (not shown). The carrier frequency of the plasma is 14 kilohertz.

As shown in FIG. 11, an interferometer 1110, such as a Michelson interferometer, was used to measure the Optical Path Difference, index of refraction, and electron density of the plasma 1058. For example, as illustrated, in this setup, a plurality of optical components were set up on a floating table to reduce noise from external vibrations. A laser 1112, such as a 25 milliwatt helium-neon laser with high beam stability was utilized as a light source. As a beam 1114 from the laser 1112 entered the interferometer 1110 it was split into two paths, a reference path 1114a and a measurement path 1114b. The reference path 1114a reflected off a beam splitter 1116 and reflected directly back. The measurement path 1114b passed through the beam splitter 1116 into the plasma chamber 1000 and then reflected back. At the output of the interferometer 1110 the beams were recombined to produce an interferogram which was imaged onto a Spot Image 12-bit, 5 megapixel, digital camera. Analysis of the interferogram provides for calculation of the average index of refraction inside the plasma chamber 1000.

Figure 12:
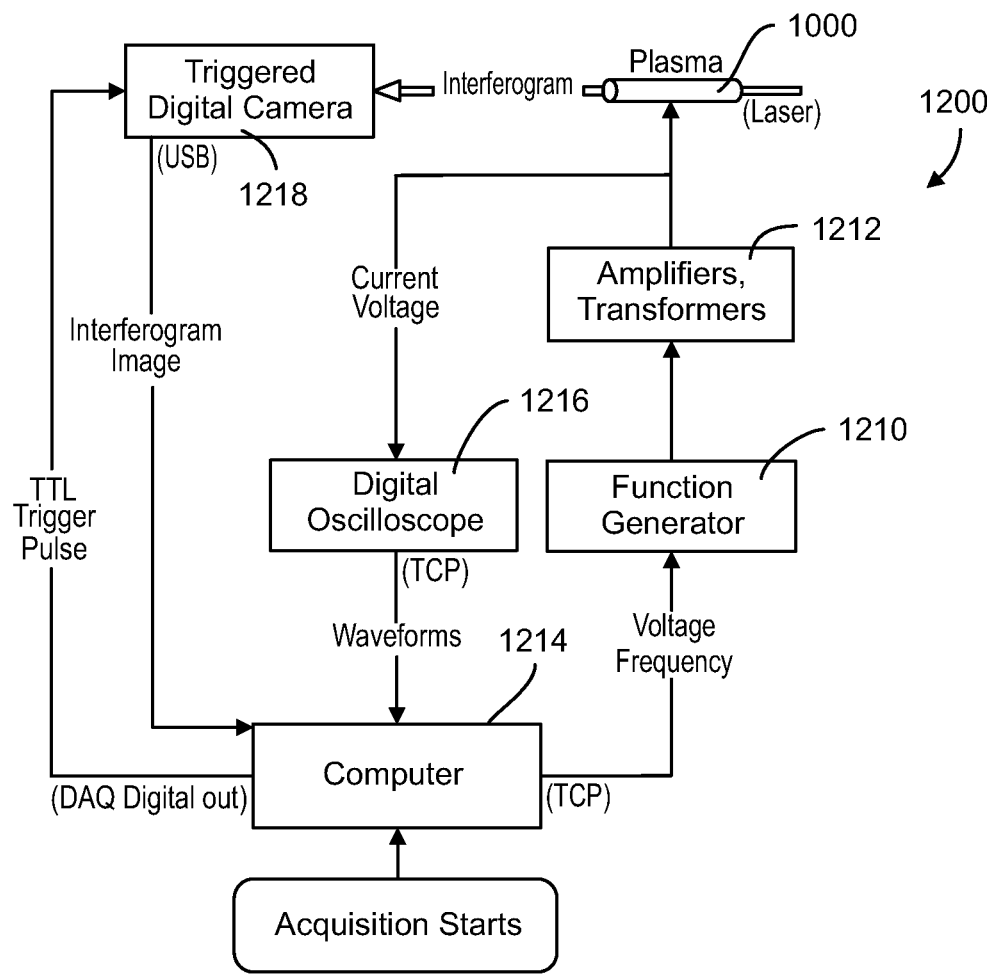
FIG. 12 is a schematic of an example data acquisition system for use in sensing and controlling the example adaptive optics devices described herein.
Figure 13:
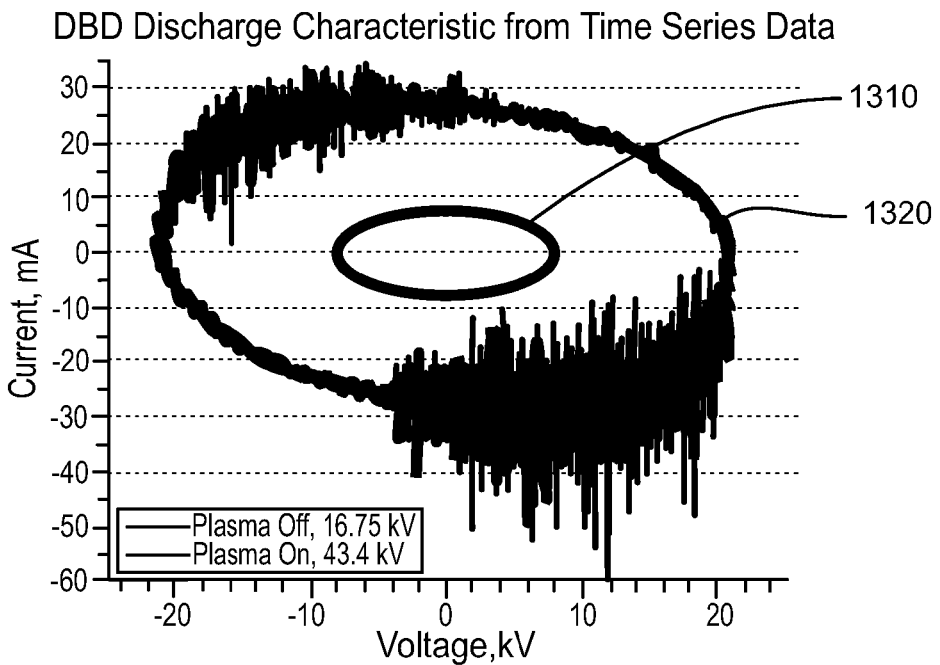
FIG. 13 is graph of a current-voltage polar for the example plasma cell of FIG. 10.

Turning to FIG. 12, a schematic of an example data acquisition system 1200 is illustrated. The system 1200 includes a function generator 1210, such as, for example, an Agilent 33220A function generator, to control the voltage potential across the electrodes 1014, 1016 of the plasma chamber 1000. An AC output from the function generator 1210 is transformed into a high voltage, low current signal using an amplifier 1212, such as two Crown XTi4000 amplifiers and two high frequency transformers. The output of the function generator 1210 is controlled through a processor, such as a computer 1214 using any suitable connection, such as a TCP socket connection.

In this example, experiments were conducted at fixed pressure values inside the chamber. At each pressure, a range of voltage potentials were applied to the plasma chamber 1000. For each voltage potential, voltage and current time-series data and two interferogram images were acquired by an oscilloscope 1216 electrically coupled to the computer 1214. The interferograms were acquired with a digital camera 1218 connected to the computer 1214 and triggered with a TTL pulse from the computer 1214.

Vacuum pressure inside the chamber 1000 was measured with a pressure gauge (not shown), such as a Heise H51011 absolute pressure gauge. The voltage potential of the output from one of the transformers 1212 was measured with a voltage probe (not shown), such as a LeCroy PHV4-1903 high voltage probe, and the current was measured with a current monitor (not shown), such as a Pearson 2100 current monitor. Both signals were connected to the oscilloscope 1216, such as a LeCroy WaveRunner LT264 oscilloscope. The A/D converter of the example oscilloscope 1216 was 8-bit and simultaneous with 1 GHz sampling frequency suitable for capturing some of the plasma discharge spikes, which appear in the current measurement.

In this example, all acquisitions and timing were controlled through a master program to allow for better reproduction of results. In a single acquisition, of the described example, the following actions were performed: (1) the digital out port sends a TTL trigger to the camera to acquire a reference (voltage-o) interferogram; (2) the computer sets the appropriate voltage on the function generator and enables the output to generate a plasma; (3) a digital out port sends a TTL trigger pulse to the camera to capture the active (voltage-on) interferogram; (3) the computer sets the appropriate time/voltage scales on the oscilloscope and acquires 12 periods of the current and voltage waveforms; (4) the output to the function generator is turned off; (5) a twenty second timeout is enforced. This process repeats for a range of function generator voltages.

As described above, the relationship between electromagnetic waves (laser light) within a plasma field was explored. In general, two frequencies, the laser optical frequency $\omega$, and the plasma frequency $\omega_P$, are defined in Equations (14) and (15) as:

$$\omega = \frac{2\pi}{\lambda} c \qquad (14)$$

$$\omega_P = \frac{n_e q^2}{m_e \epsilon_0} \qquad (15)$$

with $\lambda$ being the laser wavelength, c the speed of light, $n_e$ the electron density, q the elementary charge, $m_e$ the electron mass, and $\epsilon_o$ the electric constant. The dispersion equation (Equation (16)) describes the refractive index change due to oscillating free electrons and heavy particles inside a plasma field:

$$N = 1 - \frac{\omega_P^2}{2\omega^2}\left(A + \frac{B}{\lambda^2}\right)\frac{n_{heavy}}{n_{heavy0}} \qquad (16)$$

where N is the plasma index of refraction, A and B are species constants, and $n_{heavy}$ and $n_{heavy0}$ are the heavy particle densities at a specific and standard pressure, respectively. The latter terms may be neglected when the pressure is low and the laser wavelength is large. This work considers pressures in the 25-45 torr range and it is assumed that the heavy particle density is low enough to neglect its contribution to the index of refraction, and therefore as in Equation (17):

$$N = 1 - \frac{1}{2}\left(\frac{\omega_P}{\omega}\right)^2 \qquad (17)$$

As shown in Equation (18), Equations (14), (15), and (17) are solved for the electron density:

$$n_e = 2(1-N)\left(\frac{m_e \epsilon_0}{q^2}\right)\left(\frac{2\pi}{\lambda}c\right)^2 \qquad (18)$$

The interferometer 1110 was used to measure the Optical Path Difference, refractive index, and plasma electron density of the plasma cell. The output of the interferometer 1110 is an interferogram image, which is post-processed to determine the desired values. When plasma 1058 is present inside the chamber, the fringes in the interferogram are shifted to the left due to the change in refractive index. As noted, two images are acquired for every voltage potential: a reference and an active image. As discussed herein, processing the pair of images returns the Optical Path Difference in pixels, which is related to the phase shift $\phi$ by Equation (19):

$$\phi = OPD_{px}\frac{2\pi}{\lambda_{px}} \qquad (19)$$

where $OPD_{px}$ is the Optical Path Difference from the interferograms in pixels and $\lambda_{px}$ is the spatial wavelength of the interferograms in pixels. For the interferometer 1110, the average refractive index of the plasma chamber with electrode spacing d is defined by Equation (20):

$$N = 1 + \phi\frac{1}{2d}\frac{\lambda}{2\pi} \qquad (20)$$

The instantaneous power of the plasma is the product of current and voltage. For discrete time series data collected during the experiment, the power is defined as Equation (21):

$$P = \frac{1}{K}\sum_{j=1}^{K} V_j I_j \qquad (21)$$

where K encloses an integer number of cycles. In the experiment, discrete time series data for the plasma applied voltage and current are recorded for post-calculation of the power. Another quantity of interest is the point at which stable plasma initiates inside the chamber. This is found from inspection of the phase angle between voltage and current as noted in Equation (22):

$$\phi_{VI} = \cos^{-1}\left(\frac{P_{RMS}}{P}\right) \qquad (22)$$

where $P_{RMS}$ is the root-mean-square of power. Without plasma, the phase angle of power remains very close to 90 degrees. At the initiation of plasma there is a sudden decrease in phase. From experimental observations it is noted that stable plasma does not form until a phase-angle of about 85 degrees. This is the metric adopted for stable plasma initiation. The term stable is used to describe a plasma with no visual transients in the structure and formation of the plasma; an unstable plasma flickers intensity values and can move around within the chamber.

As noted, a model for plasma electron density derived from a Buckingham-Pi analysis includes the variables power P, electron density $n_e$, gas pressure p, gas density $\rho$, and electrode gap distance d. The five properties are expressed in basic dimensions (mass M, length L, time T) as follows:

$$P \doteq ML^2 T^{-3} \qquad (23)$$

$$n_e \doteq L^{-3} \qquad (24)$$

$$\rho \doteq ML^{-3} \qquad (25)$$

$$p \doteq ML^{-1} T^{-2} \qquad (26)$$

$$d \doteq L$$

A dimensional matrix is constructed and shown below in Equation (28) reduced echelon form.

$$D = \begin{pmatrix} 1 & 0 & 0 & 2/3 & 0 \\ 0 & 1 & 0 & -2/9 & -1/3 \\ 0 & 0 & 1 & 1/3 & 0 \end{pmatrix} \qquad (28)$$

With five variables and three dimensions, we expect two pi-groups: $\Pi_1$ and $\Pi_2$. The right null-space vectors of the over-determined system in D gives the two pi-groups:

$$\Pi_1 = \left( \frac{p^3}{P^2 n_e^{4/3} \rho} \right)^{1/3} \qquad (29)$$

$$\Pi_2 = \frac{d}{n_e^{1/3}} \qquad (30)$$

Using the ideal gas law, the first pi-group is rewritten to eliminate density, $$\Pi_1 = \left( \frac{p^2 RT}{P^2 n_e^{4/3}} \right)^{1/3} \qquad (31)$$

Recall that the generated dielectric barrier discharge plasma is considered non-thermal and so temperature equals the surrounding temperature in the ambient environment. A function f is sought such that $$f(\Pi_1, \Pi_2) = 0. \qquad (32)$$

A solution is found by taking the product of the pi-groups and forcing the point of stable plasma initiation to match experimental data, $$\exists f(\Pi_1 \Pi_2) | f(P_0) = n_{e0} \qquad (33)$$

This solution is written in terms of electron density, $$n_e = n_{e0} + N_P (p^2 d^3 RT)^{3/7} \left( \frac{1}{P^{6/7}} - \frac{1}{P_0^{6/7}} \right) \qquad (34)$$

where $n_{e0}$ and $P_0$ are the electron density and power at the initiation point of stable plasma. Introducing $N_P$ as a non-dimensional plasma number created from $\exists_1$, $$N_P = -n_e \left( \frac{P^2}{p^2 d^3 RT} \right)^{3/7} \qquad (35)$$

The plasma number is negative, so from Equation (34) we see that as power increases, the electron density increases.

The model, however, features two limitations: (1) the power and electron density at plasma initiation is required for any pressure of interest, and (2) the plasma number must be determined. With both of these found from experiment, the model predicts the electron density for any power, pressure, and electrode gap distance. More importantly, for further design of the plasma cell 50, this model illustrates the dependence on these specific variables During the experiments, atmospheric temperature and pressure were recorded before each test. Data was collected for three pressures inside the plasma chamber: 25.86 torr, 33.61 torr, and 41.73 torr. At each pressure, data was taken at 16 different voltage potentials ranging from 14 to 44 kV. Post-analysis of the current and voltage data gives a power measurement. Analysis of reference-active interferogram image pairs provides the Optical Path Difference, index of refraction, and electron density measurements.

Figure 14:
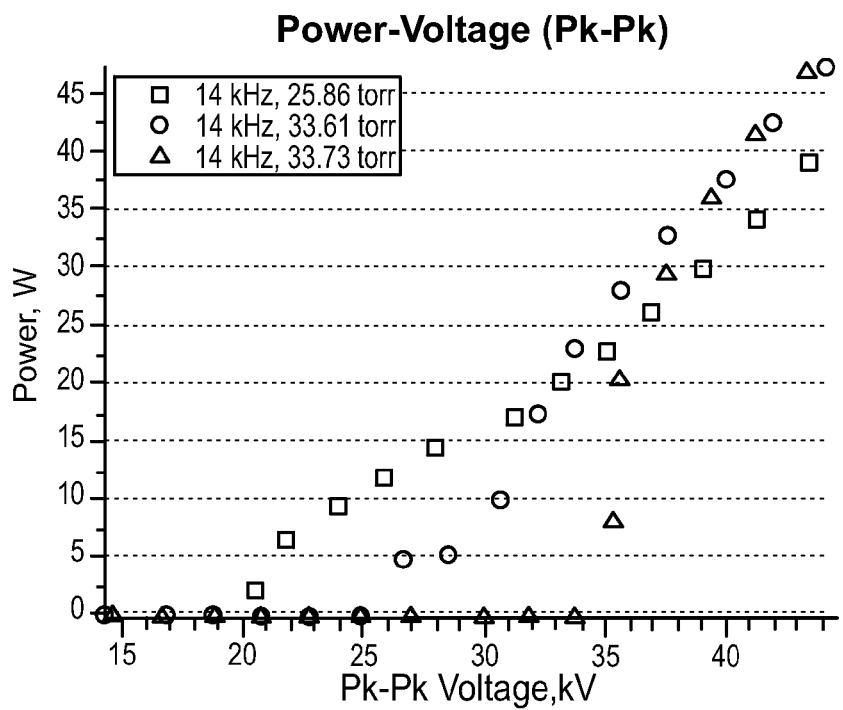
FIG. 14 is graph of a power-voltage for the example plasma cell of FIG. 10.

Referring to FIGS. 13-16, in the polar of voltage and current (FIG. 13), the typical discharge current spikes 1310 corresponding to a dielectric barrier discharge gas discharge is shown. The power is equal to the enclosed area within the elliptical path. It is easily seen that when plasma is present in the chamber 1320, the power increases. With plasma, spike in the current are visible corresponding to filamentary current flow within the plasma. Additionally, the power curves for each pressure are shown in FIG. 14. Until plasma is generated, the power remains closer to zero. With plasma, the power increases with applied voltage. Higher voltages are required to generate plasma at higher pressures. We can see power increases with applied voltage potential once plasma forms.

Figure 15:
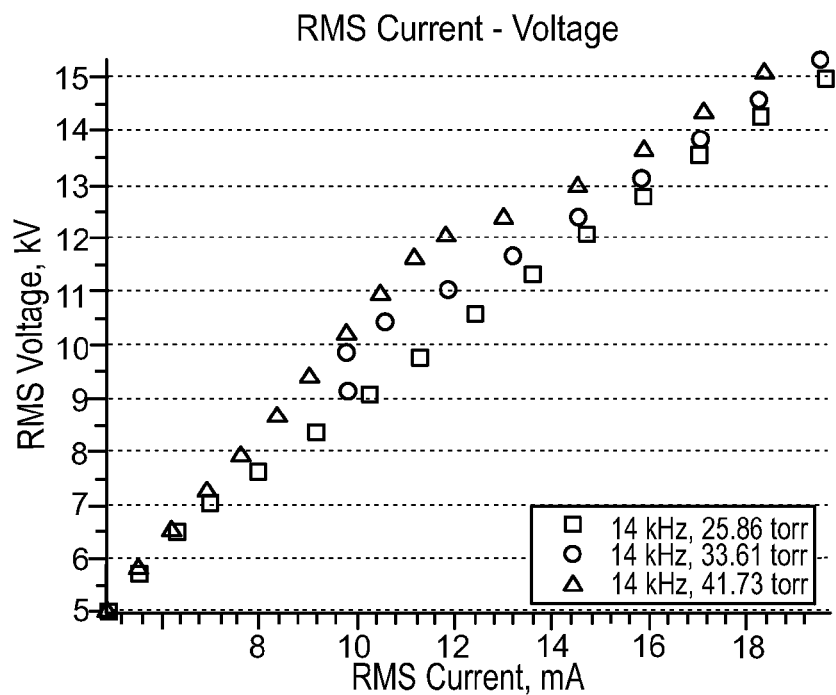
FIG. 15 is a graph of a current-voltage for the example plasma cell of FIG. 10.
Figure 16:
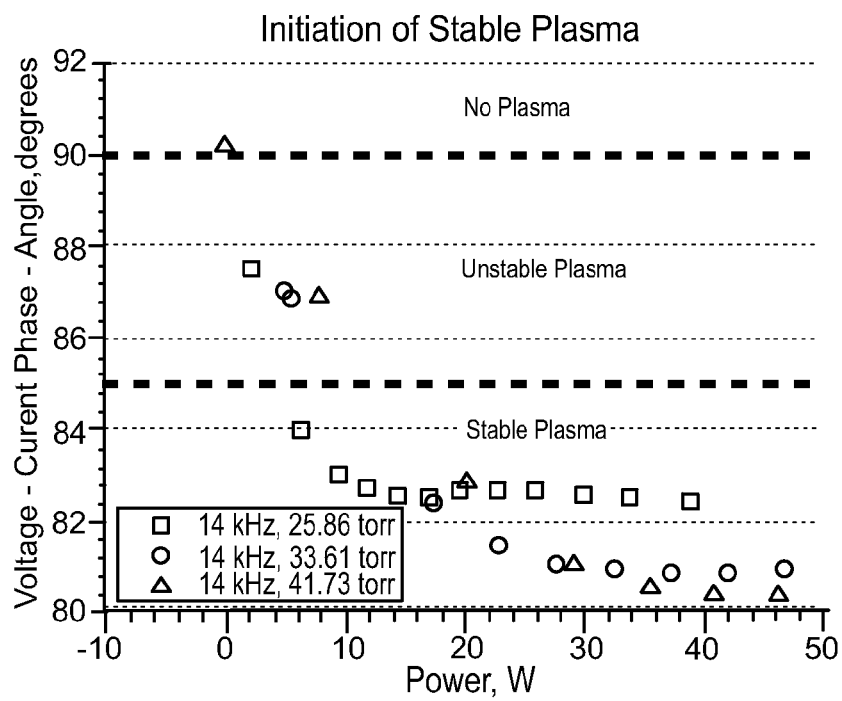
FIG. 16 is a graph of a current-voltage phase angle for the example plasma cell of FIG. 10.

The voltage-current plot in FIG. 15 gives indication to when plasma initiates inside the chamber. For any pressure, the voltage-current data has a fixed slope until some point when the slope suddenly decreases, representing an increase in current due to the flow of free electrons within the plasma. However, a better metric for identifying stable plasma generation is by monitoring the voltage-current phase-angle, shown in FIG. 16. In this example, the first point within the stable plasma regime is selected as the initiation point for use later in the electron density model. The phase-angle between voltage and current is presented as a metric for detecting the beginning of a stable plasma regime. As illustrated, stable plasma is expected to occur for phase-angles less than 85 degrees.

Recall that for every voltage potential, two interferograms are recorded (reference and active). Simple image processing techniques applied to each interferogram image determines the fringe locations. The difference between the active and reference states gives the Optical Path Difference, index of refraction, and electron density.

First, each interferogram image is cropped to a specific interrogation region of interest. A two-dimensional disk filter is convolved over each image to smooth-out intensity values without distorting the locations of the fringes. User input is required to register a pair of corresponding fringes between each reference-active image pair. The data within the interrogation region is then analyzed row-by-row.

A single row from an interferogram consists of sinusoidal intensity values with peaks corresponding to light areas and valleys corresponding to fringe areas. A fringe-tracking algorithm is used to locate the center of each fringe and keep count of the fringe numbers. This process repeats for every row within the interrogation region.

Figure 17:
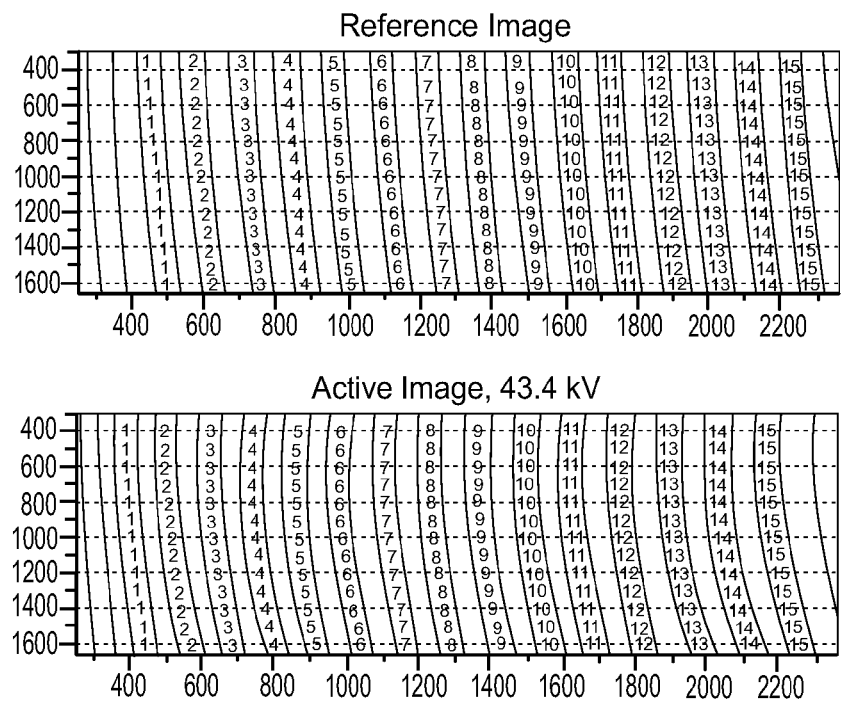
FIG. 17 is an example output from fringe-tracking showing the change between active and reference images.
Figure 18:
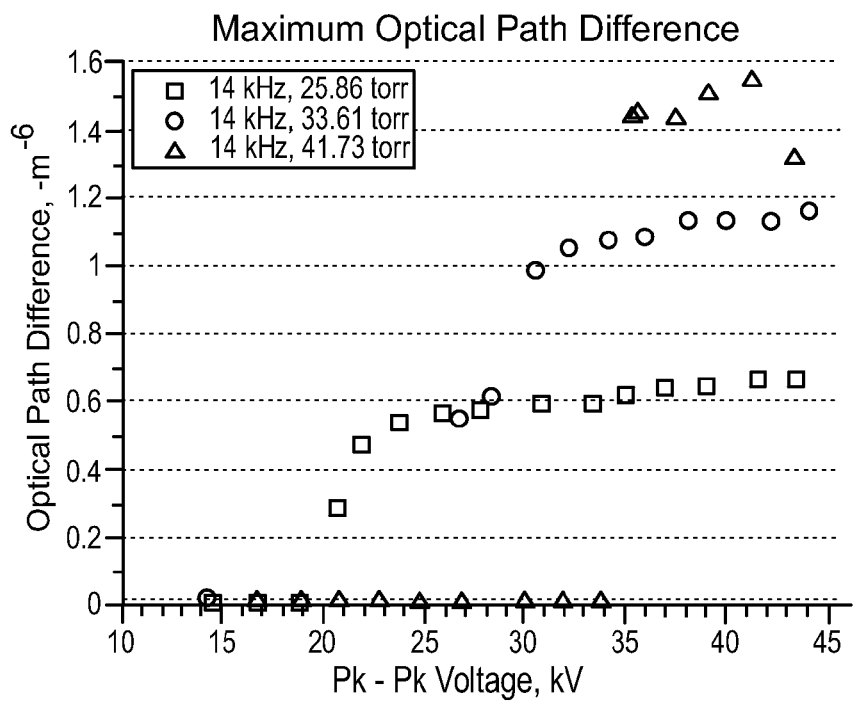
FIG. 18 is a plot of a maximum Optical Path Difference against the applied voltage for the example plasma cell of FIG. 10.
Figure 19:
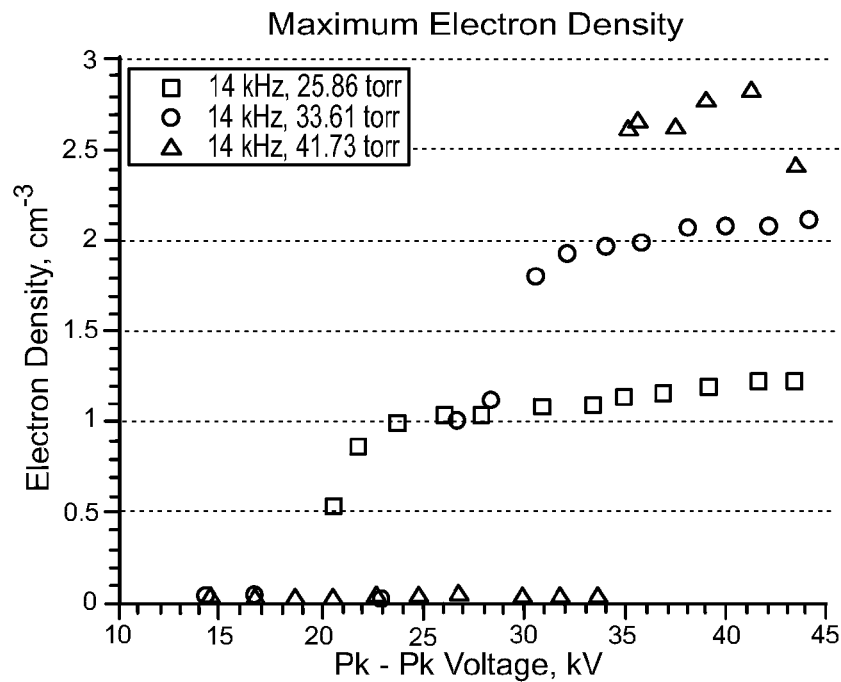
FIG. 19 is a plot of a maximum electron density against the applied voltage for the example plasma cell of FIG. 10.

FIG. 17 shows the reference and active interferograms with the detected fringe locations overlaid on top. The change in a specific fringe's position between the active and reference images is equal to the local Optical Path Difference in pixels. Computing this over the entire interrogation region produces spatial maps of the Optical Path Difference. These Optical Path Difference values are transformed into spatial maps of refractive index and electron density. The maximum Optical Path Difference and electron density values are extracted from each spatial map and plotted versus applied voltage potential in FIGS. 18 and 19. The latter values are used in the electron density model. To note, although the electron density measurements were not verified with a second measurement technique, the values do fall within an expected range.

We present the non-dimensional plasma number as constant for a particular plasma device and gas arrangement. If the geometry of the device changes, such as the dielectric thickness or the actuator length, the plasma number is expected to change. Likewise, if we the air inside the chamber is replaced with another gas (i.e. argon) then the number would change. We find the plasma number from Equation (36).

$$n_e^* = \left(\frac{p^2 d^3 RT}{P^2}\right)^{3/7} \quad (36)$$

Figure 20:
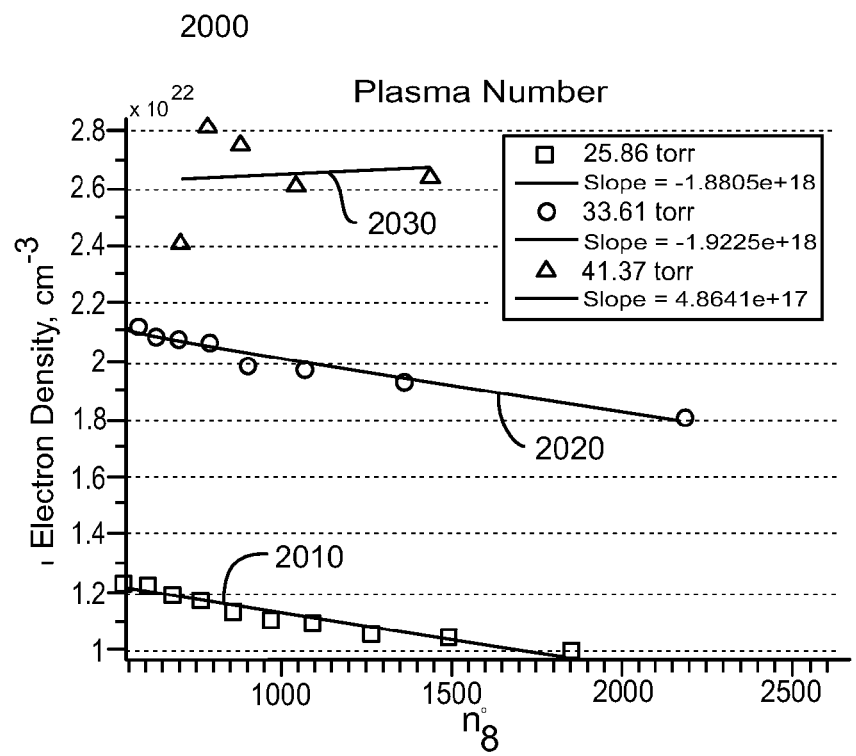
FIG. 20 is a plot of a determination of the plasma number of the example plasma cell of FIG. 10.
Figure 21:
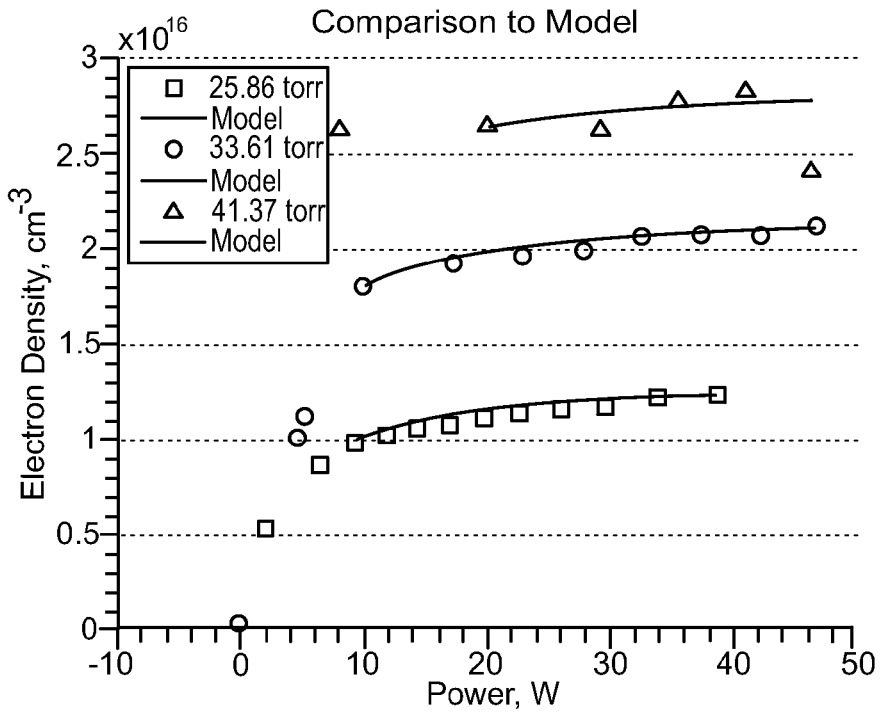
FIG. 21 is a plot of the electron density model compared to experimental data for the example plasma cell of FIG. 10.
Figure 22:
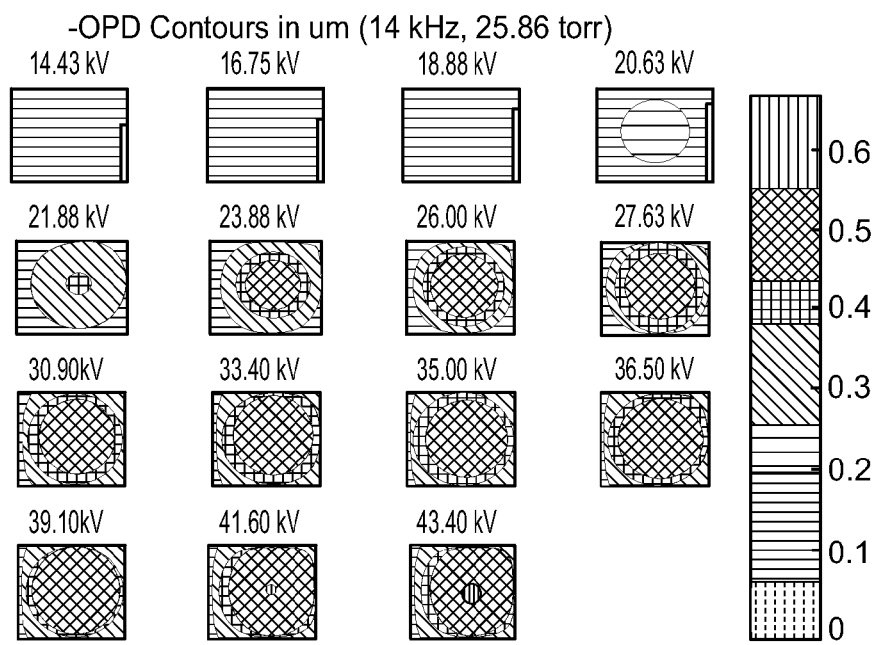
FIG. 22 is a plot of the spatial contours of −OPD in $10^{-6}$ m for 25.86 torr shown for each applied voltage.
Figure 23:
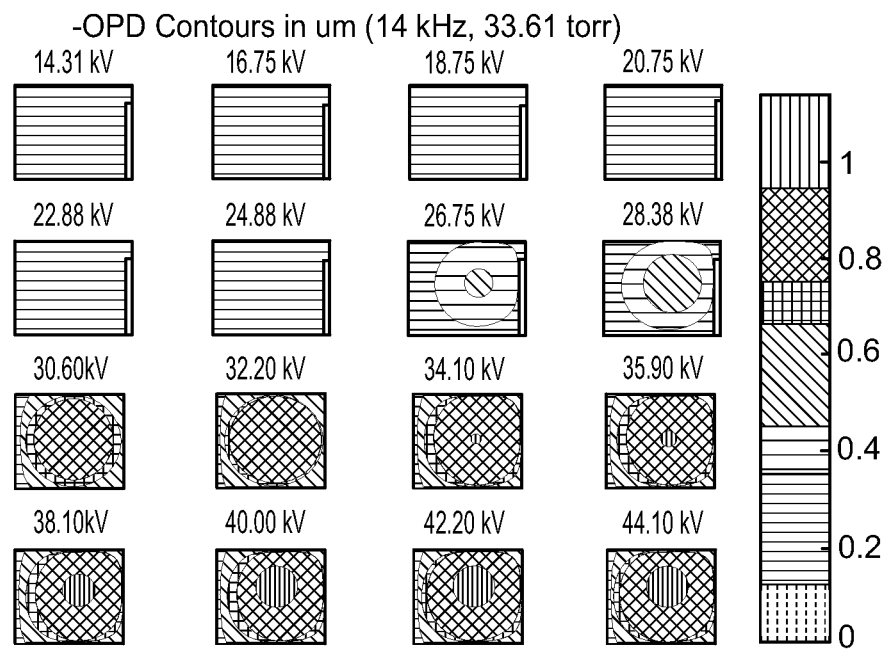
FIG. 23 is a plot of the spatial contours of −OPD in $10^{-6}$ m for 33.61 torr shown for each applied voltage.
Figure 24:
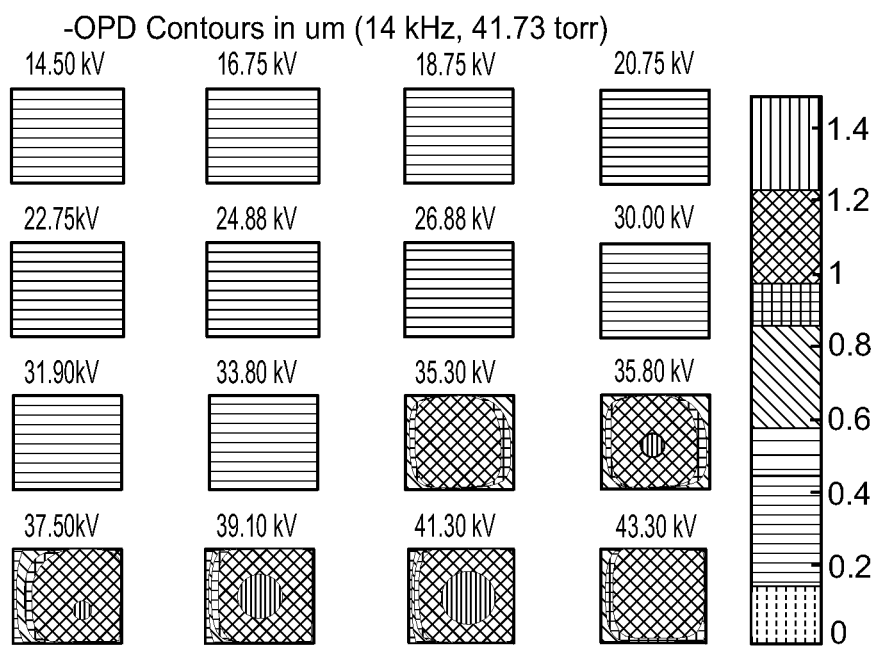
FIG. 24 is a plot of the spatial contours of −OPD in $10^{-6}$ m for 41.73 torr shown for each applied voltage.

A plot of $n_e$ versus $n_e^*$ should produce a straight line with a slope of the plasma number. This plot 2000 is shown in FIG. 20 for the experimental data. Good agreement is observed for the data at pressures 25.86 (2010) and 33.61 torr (2020), but the data for 41.37 torr (2030) does not seem to contribute any such trend. This data is considered to be of questionable validity due to the low number of points with actual plasma present and is thus neglected in the determination of the plasma number. Averaging the slopes from the remaining data, the plasma number is $-1.9015 \times 10^{18}$.

The electron density model has been derived from a Buckingham-Pi analysis of chosen plasma variables. Some experimental values were required for the model, namely (1) the plasma number calculated in the previous section and (2) the power and electron density values at stable plasma initiation (found from the phase angle, FIG. 16). Applying these values to Equation (34) and evaluate at each of the three pressures.

Ignore the 41.37 torr data set in the analysis due to the low number of data points and disagreement with other data. At the other two pressures, good agreement is observed between the model and the experimental data, and particularly at higher voltages. At lower voltages, the model slightly overpredicts the electron density, this is an indication that the power/electron density initiation values may be too high.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An adaptive plasma optics cell comprising:
  a housing defining a chamber;
  a gas disposed within the housing chamber;
  a first electrode layer coupled to a first side of the housing;
  a second electrode layer coupled to a second side of the housing such that the housing chamber is at least partially disposed between the first and second electrode layers;
  a dielectric layer coupled between the first and second electrode layer;
  a power supply coupled to each of the first and second electrode layers and adapted to supply an electric signal sufficient to cause the gas to generate a plasma having a first plasma gradient; and
  a controller coupled to the power supply and adapted to adjust the electric signal supplied between the first and second electrode layers to cause the gas to generate a plasma having a second plasma gradient different than the first plasma gradient,
  wherein when a light passes through the generated plasma, the first plasma gradient causes the light to refract at a first angle, and the second plasma gradient causes the light to refract at a second angle.

2. An adaptive plasma optics device comprising:
  An array of adaptive plasma optic cells as defined in claim 1.

3. An adaptive plasma optics device as defined in claim 2, wherein the controller is configured to separately adjust the electric signal supplied to each adaptive plasma optics device.

4. An adaptive plasma optics cell as defined in claim 1, wherein at least one of the first and second electrode layers is an Indium Tin Oxide electrode.

5. An adaptive plasma optics cell as defined in claim 1, further comprising a reflective surface disposed relative to at least one side of the housing and configured to reflect a light passing through the housing back through the housing.

6. An adaptive plasma optics cell as defined in claim 5, wherein at least one of the second electrode layer, the second side of the housing, or the dielectric layer is reflective.

7. An adaptive plasma optics cell as defined in claim 1, further comprising a wavefront sensor coupled to the controller and adapted to receive a light passing through the plasma optics cell,
  wherein the wavefront sensor is configured to sense the wavefront associated with the light passing through the cell.

8. An adaptive plasma optics cell as defined in claim 7, wherein the wavefront sensor detects distortions within the sensed wavefront, and wherein the controller is configured to adjust the electric signal supplied between the first and second electrodes in response to the detected distortions.

9. An adaptive plasma optics cell as defined in claim 1, wherein the controller has a frequency response to adjust the electric signal supplied to the first and second electrode layers of faster than approximately 100 kHz.

10. An adaptive plasma optics cell as defined in claim 1, wherein the housing is glass.

11. An adaptive plasma optics cell as defined in claim 1, wherein the dielectric layer is integrally formed with the housing.

12. A method of modifying a distorted wavefront comprising:
  passing a light having a first wavefront through a plasma generating optics device comprising at least two electrodes, wherein the generated plasma has a first gradient and causes the light to refract at a first refraction angle;

detecting the wavefront of the refracted light;
identifying a distortion in the detected wavefront; and
proving a control instruction to the plasma generating optics device to cause the plasma generating device to generated a plasma having a second gradient the causes the light to refract at a second refraction angle.

13. A method as defined in claim 12, wherein the plasma generating optics device comprises:
a housing defining a chamber;
a gas disposed within the housing chamber;
a first light electrode layer coupled to a first side of the housing;
a second electrode layer coupled to a second side of the housing such that the housing chamber is at least partially disposed between the first and second electrode layers;
a dielectric layer coupled between the first and second electrode layers; and
a power supply coupled to each of the first and second electrode layers and adapted to supply an electric signal sufficient to cause the gas to generate the plasma.

14. The method of claim 12, wherein the plasma generating optics device comprises a plurality of separate plasma generating devices, each capable of generating a plasma that refracts a portion of the light passing through the plasma.

15. The method of claim 14, further comprising separately proving a control instruction to each of the plurality of separate plasma generating devices.

16. The method of claim 15, wherein the plasma generating optics device further comprises a reflective surface forming a mirror.

17. An adaptive plasma optics cell comprising:
a housing having a first surface and a second surface;
a first electrode coupled to the first surface of the housing;
a second electrode coupled to the second surface of the housing;
a power supply coupled to each of the first and second electrodes and adapted to supply a voltage sufficient to cause a plasma having a first plasma gradient to form between the first and second electrodes; and
a controller coupled to the power supply and adapted to change the voltage supplied to the first and second electrode to cause a plasma having a second plasma gradient to form between the first and second electrodes,
wherein at least one of the first and second electrodes is light transmissive to allow a light to pass through the transmissive electrode and through the generated plasma.

18. An adaptive plasma optics cell as defined in claim 17, wherein when the light passes through the generated plasma, the first plasma gradient causes the light to refract at a first angle, and the second plasma gradient causes the light to refract at a second angle different than the first angle.

19. An adaptive plasma optics cell as defined in claim 17, further comprising at least one dielectric barrier at least partially between the first and second electrodes.

20. An adaptive plasma optics cell as defined in claim 17, further comprising a reflective surface configured to reflect the light after passing through the transmissive electrode and the generated plasma.

* * * * *